Figure 1:
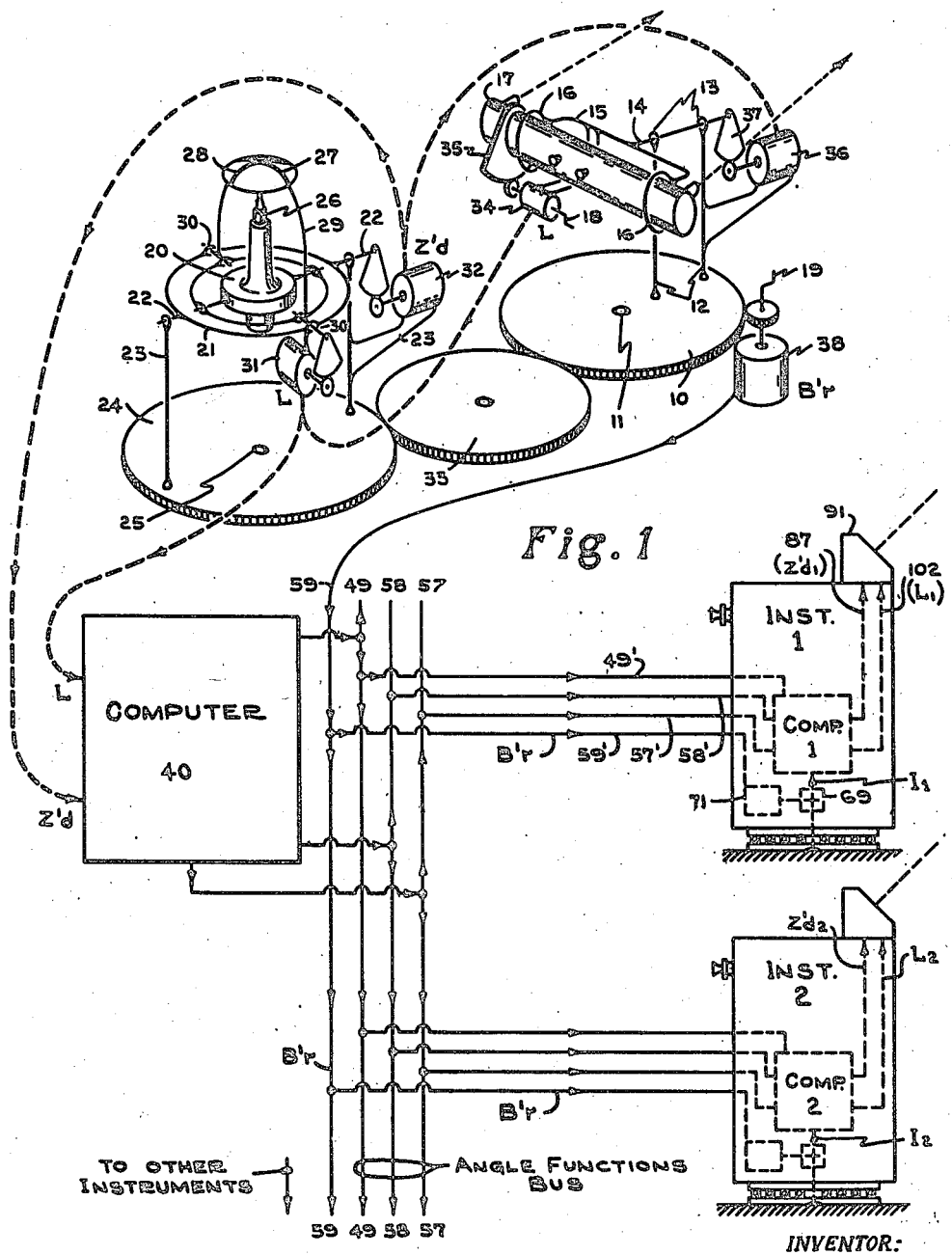

Patented Mar. 8, 1949

2,463,687

UNITED STATES PATENT OFFICE 2,463,687

INSTRUMENT STABILIZING MECHANISM

Edmund D. Gittens, Roselle, N. J., assignor to Arma Corporation, Brooklyn, N. Y., a corporation of New York Application October 5, 1945, Serial No. 620,595

18 Claims. (Cl. 318—19)

This invention relates to instrument stabilizing mechanism, and has particular reference to mechanism for stabilizing ordnance instruments mounted on unstable supports, such as ships, aircraft, tanks, and the like.

Ordnance instruments, including sights, dummy guns, and in some cases actual guns, are usually stabilized with deck angles measured by a stable element at a predetermined point on the ship or other unstable support. These angles are correct only during coincidence between the orientation of the stable element and the instrument in question, and as such coincidence is rare, a comprise for the usual non-coincidental orientation is effected which is not accurate. One way of correcting for this condition is to employ a master stable element which is in constant rotation and consequently measures and transmits the constantly changing angle values to the several remote instruments, these values being corrected for each instrument in accordance with its orientation and location relative to the stable element, and the like. Such individual stabilization by a constantly rotating master stable element is proposed in copending application Serial No. 604,156, filed July 10, 1945, jointly by George Agins and applicant.

Many ships and other unstable craft are already equipped with a stable element for an observation instrument or the like, such as a rangefinder, and it would be convenient and economical in equipment, space, and weight if such stable element were usable as a common source of angular values for stabilizing numerous remote and different instruments, as does the special master stable element in the mechanism of said copending application. However, being a necessary accessory to a connected observation instrument in the usual arrangement, the orientation of the stable element is that of the observation instrument whose orientation is in turn indiscriminate compared to that of the remaining instruments sought to be stabilized, since the latter must be independent of each other so as to be free to observe a different target from that upon which the stabilized instrument is directed.

In accordance with the present invention, a stabilizing mechanism is provided which develops mathematically correct deck angles for a multiplicity of separate and remote instruments, from an existing stable element oriented in accordance with the orientation of an observation instrument, notwithstanding that the orientation of the latter is independent of the orientation of the independent other instruments sought to be stabilized.

The invention comprises calculating mechanism including a master computer adapted to convert the angular values measured by the stable element into functions of such angular values usable by the individual remote instruments, after compensation for displacement thereof from the stable element and for the instantaneous difference in orientation between the latter and the stabilized instrument, which orientation may, and usually is changing irregularly as the stabilized instrument follows its target and maintains the coincidental orientation of its connected stable element. The calculating mechanism corresponding to each remote instrument, other than the aforementioned directly stabilized instrument, applies the calculated angles peculiar thereto for stabilizing the same.

Figure 2:
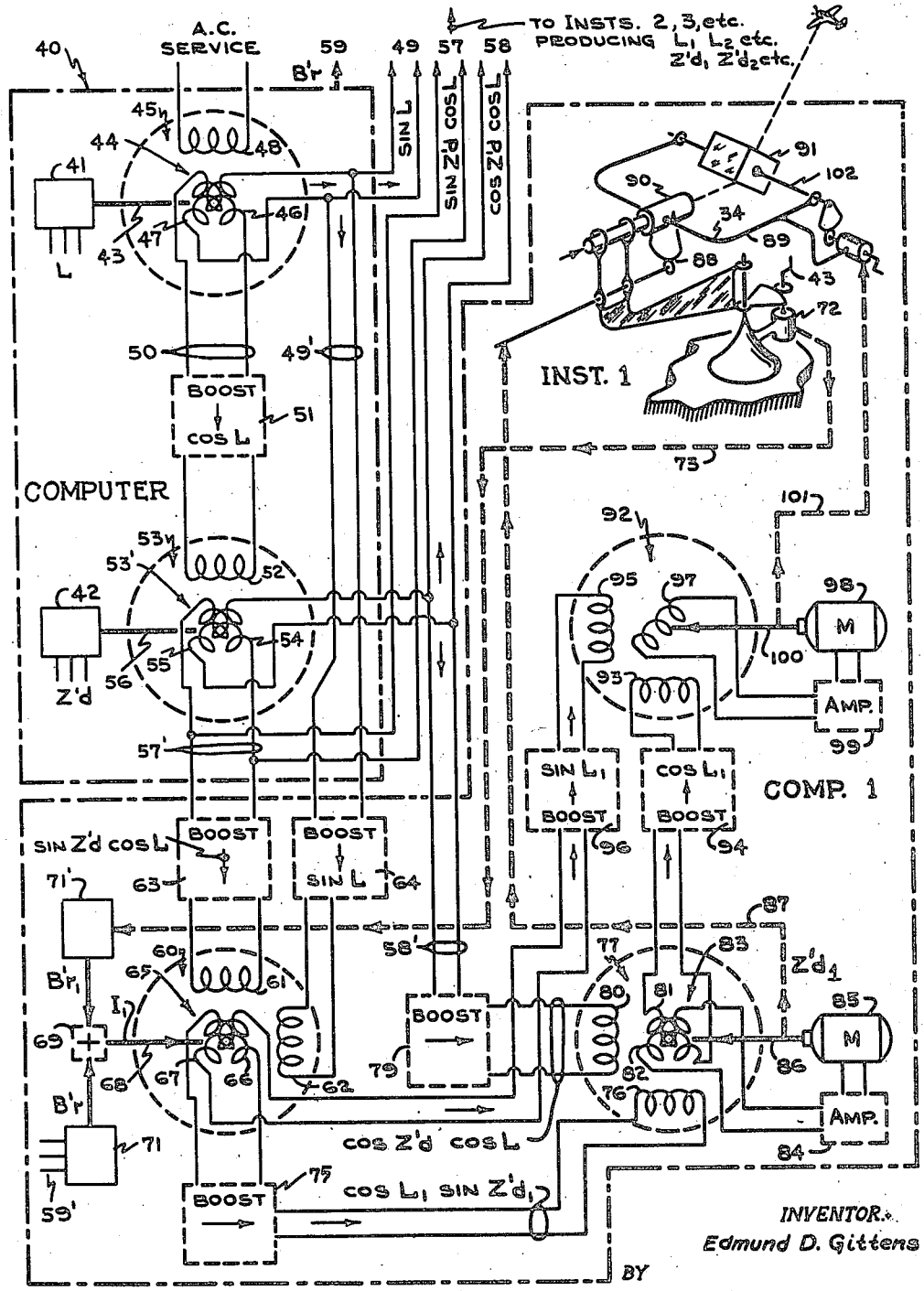

For a more complete understanding of the invention, reference may be had to the accompanying drawings, in which:

Figure 1 illustrates schematically and diagrammatically a well-known type of stabilized observation system, to which has been added the conversion system of this invention whereby numerous different and remote instruments may be stabilized from the existing stabilizing system with the accuracy obtainable by a directly-connected individual stable element for each instrument; and, Fig. 2 is a diagram of the electrical calculating mechanism indicated in Fig. 1.

For purposes of illustration, a more or less standard anti-aircraft range finder will be described in operative association with the stabilizing mechanism of this invention. Such range finder usually includes a rotary platform 10 mounted for target bearing rotation about an axis 11 perpendicular to the deck of the ship or other support. Stanchions 12 mounted on platform 10 carry bearings 13 in which is journalled the parallel shaft 14 carrying the frame 15 having ring bearings 16 in which the range finder 17 is rotatable about its normally horizontal axis by means of handcrank 18. The range finder 17 is thus movable both in a plane perpendicular to the deck upon the shaft 14, as well as about its long axis so as to follow a target in elevation. A handcrank 19 is geared to platform 10 for training the range finder 17 about vertical platform axis 11.

Unless stabilized against the angular movements of the ship, the image of an aerial target brought into the field of view by training and elevating the range finder 17 when the ship is on even keel will be lost to view immediately when the ship heels over. In order to prevent such effects, corrections are commonly provided by a stable element, such as a gyroscope 20 carried on ring 21 mounted on regular gimbal ring bearings 22 in stanchions 23 mounted on a platform 24 pivoted about a perpendicular axis 25. The casing of gyroscope 20 carries a center transformer primary winding 26 adapted to inductively cooperate with two sets of half-coils transformer secondaries 27 and 28 mounted at right angles in the field of transformer primary 26 on a ball 29 pivoted about axis 30, 30 on gimbal ring 21 at right angles to axis 22, 22. Voltages induced in double coil 27 by a tilt about axis 30, 30, energize motor 31 to restore ball 29 and double coil 27, whereas a tilt about axis 22, 22 induces a voltage in double coil 28 which causes motor 32 to restore gimbal ring 21 and ball 29 to normal position.

Platform 24 is geared to platform 10 through an idler gear 33, so that the gimbal axes 22 and 30 of the gyroscope remain in the same angular relation to the shaft 14 and the longitudinal axis of the range finder 17 at all train angles. As the gyroscope gimbals move relatively to the gyroscope in coordinate planes, the respective level (L) and cross-level (Z′d) angles are transmitted electrically by follow-up motor-transmitter 31 to level motor 34 for rotating the range finder 17 through gearing 35 about its longitudinal axis, and by motor-transmitter 32 to cross-level motor 36 for rotating shaft 14 through gearing 37. Thus, the level angle (L) of the ship is measured and applied to the observation instrument 17 in the vertical plane of the line of sight, and cross-level angle (Z′d) is measured in a plane at right angles to the sight plane and is applied to the instrument 17 to swing it bodily about its central pivoted axis 14. When the instrument is oriented to follow a target in train by the operator's crank 19, the gyroscope system is likewise oriented in synchronism therewith through gearing 10, 33, 24.

In this way the range finder 17 or other instrument is stabilized to keep the target in the field of view, and in present practice each range finder or other instrument requiring stabilization is provided with its own stabilizing mechanism located immediately adjacent thereto so as to partake of and thus accurately detect the same angular movements that it undergoes. Obviously, where a great many observation and calculating instruments are required, capable of and required to independently point to targets in different directions, such as the gun fire control instruments distributed throughout a battleship, much duplication and hence cost, weight and space expenditure results. Also, since the gyroscope system is geared to instrument 17, it cannot be directly used for stabilizing other instruments directed in different directions.

The present invention, which enables universal stabilization use of the gyroscope system 20—23, notwithstanding that it is geared to and hence peculiar to the individual operating requirements of range finder 17 or other instrument, includes a common computer 40 and additional instruments designated "Inst. 1" and "Inst. 2," each having respective individual computers designated "Comp. 1" and "Comp. 2," all shown in schematic detail in Fig. 1.

Referring to Fig. 2, computer 40 is provided with electrical receivers 41 and 42 receiving respectively electrical level (L) and cross-level (Z′d) angle values from corresponding motor transmitters 31 and 32 of the gyroscope system, as indicated. The shaft 43 of level receiver motor 41 rotates the rotor 44 of the electro-mechanical trigonometric resolver 45. Resolver 45 is essentially a transformer whose secondary winding comprises the rotor 44 consisting of two coils 46 and 47, arranged in space quadrature and rotating in the field of primary or stator winding 48 so as to develop a voltage in each rotor coil which is a trigonometric function of the angular position of the corresponding rotor coil with respect to the stator 48. When two stator coils are employed in spaced quadrature, the field to which the rotor coils are subjected is the joint field produced by both stator coils.

In the case of the single stator coil 48 of resolver 45, it is energized by a constant frequency and voltage alternating current from a suitable source, not shown. Accordingly, the voltage induced in each rotor winding 46 and 47 is a direct function of the level angle (L), so that a voltage proportional to sin L is induced in rotor coil 47 and a voltage proportional to cos L is induced in rotor winding 46. Sin L voltage is impressed on bus bar 49 extending throughout the ship or other vehicle for use by various remote instruments.

Cos L voltage is fed from rotor winding 46 by wires 50 to a suitable electronic booster 51 adapted to repeat the signal without distortion so as to prevent the energy demands of succeeding instruments from reducing the cos L voltage due to internal resistance of the rotor coils. The cos L voltage, so protected, is impressed on stator coil 52 of an electromechanical trigonometric resolver 53 like resolver 45, whose rotor 53′, having its coils 54 and 55 in spaced quadrature, is rotated through the cross-level angle (Z′d) by the shaft 56 of cross-level receiver motor 42. As the stator coil 52 is energized in accordance with cos L, the voltage induced in rotor coil 54 is the product sin Z′d.cos L, whereas the voltage induced in rotor coil 55 is the product, cos Z′d.cos L, which values are impressed on bus bars 57 and 58, respectively.

In this way the instantaneous level and cross-level angle values from the gyroscope element are available as trigonometric functions for the instruments and can be related to them regardless of the orientation of the gyroscopic element and their individual orientations. A fourth bus bar 59 carries voltages proportional to the bearing angle (B′r) of the instrument 17 from transmitter 38 and since the instrument platform 10 is geared to the gyroscopic system, that bearing angle is likewise the bearing angle of the gyroscope system. The computer 40, of which there is preferably but one per ship, may be located closely adjacent to the gyroscopic element, so that direct mechanical connections may be made from the level and cross-level motors 31 and 32 to the rotors of resolvers 45 and 53, respectively. However, self-synchronous transmission systems may be employed as shown in case space requirements do not permit such close coupling.

Considering remote "Inst. 1" which may be an observation instrument, as shown, or a dummy gun, or an actual gun, such as an anti-aircraft gun of the Bofors type, its computer, designated "Comp. 1," includes an electromechanical trigonometric resolver 60 like resolvers 45 and 53 but having two stator windings 61 and 62. Stator winding 61 is connected through electronic booster 63 by wires 57' to bus bar 57 and hence is energized in accordance with sin $Z'd.\cos L$. Stator winding 62 is likewise connected through electronic booster 64 by wires 49' to bus bar 49 and hence is energized in accordance with sin $L$. The rotor 65 of resolver 60 has two coils 66 and 67 in space quadrature mounted on shaft 68 rotated from mechanical differential 69 through the angle $I_1$, which is the angle between the target bearing angle $(B'r)$ from existing instrument 17, or the gyroscopic element, and the target bearing angle $(B'r_1)$ of instrument 1. Voltage proportional to $B'r$ is obtained from bus bar 59 by wires 59' and converted to mechanical motion by receiver motor 71 and supplied to one side of differential 69. If instrument 1 carries its own computer as in Fig. 1, the other side of differential 69 is held stationary as the instrument rotates around it, but if computer 1 is stationary, and separate from instrument 1, the bearing $(B'r_1)$ input from the latter is supplied electrically by transmitter 72 and cable 73 to receiver 71' which actuates the other side of differential 69 in accordance with $(B'r_1)$.

The windings of resolver 60 of computer 1 are so arranged that a voltage is induced in rotor coil 66 which is proportional to a cosine function of the difference bearing angle $I_1$ produced on rotor shaft 68, plus a sine function thereof, according to the formula derived by spherical geometry:

$$\sin Z'd.\cos L.\cos I_1 + \sin L.\sin I_1 = \cos L_1.\sin Z'd_1 \quad (1)$$

whereas a voltage is induced in coil 67 which is proportional to a cosine function of the angle $I_1$ minus a sine function thereof, according to the formula:

$$\sin L.\cos I_1 - \sin Z'd.\sin I_1.\cos L = \sin L_1 \quad (2)$$

The voltage from rotor coil 66, proportional to $\cos L_1.\sin Z'd_1$ according to Formula 1, is fed through electronic booster 78 to stator winding 76 of electromechanical resolver 77, whereas voltage proportional to $\cos L.\cos Z'd$ is fed by wires 58' from bus bar 58 through electronic booster 79 to the other stator winding 80 of resolver 77. From spherical trigonometry $$(\cos L \cos Z'd) = (\cos L_1 \cos Z'd_1) \quad (3)$$

The windings 81 and 82 of rotor 83 of resolver 77 are connected in space quadrature and one of them, 82, serves as a "null" winding in that the resultant voltage induced therein is amplified at 84 and impressed on motor 85 whose shaft 86 drives rotor 83 until a voltage is no longer induced in null coil 82 and motor 85 deenergizes itself.

Resolver 77 thereby solves the angle $Z'd_1$, and the output voltage of rotor coil 81 then is proportional to $(\cos L_1)$. The angle $Z'd_1$ may be directly applied to motor 85 by shafting 87 and gearing 88 to the cross-leveling bail 89 carrying the sight 90 and its prism 91 of instrument 1, as shown. The equivalent connections are indicated in instrument 1 in Fig. 1.

Computer 1 of instrument 1 contains a third electromechanical resolver 92, whose stator coil 93 is energized in accordance with $\cos L_1$, from rotor coil 81 of resolver 77 through electronic booster 94. The other stator coil 95 of resolver 92 is energized in accordance with sin $L_1$ from rotor coil 67 of resolver 60 through electronic booster 96. The rotor of resolver 92 comprises a null winding 97, connected to motor 98 through amplifier 99 so that the voltage induced in null winding 97 drives motor 98 until its shaft 100 rotates null coil 97 to non-inductive position, whereupon motor 98 is deenergized. The resolver 92 is so arranged that level angle $(L_1)$ is directly indicated by motor 98 and this angle is transmitted by shafting 101 to level shaft 102 for stabilizing sight prism 91. Equivalent connections to prism 91 are indicated in Fig. 1.

Many other instruments, such as instrument 2, may be similarly stabilized by the single gyroscopic element through computer 40, the difference being the individual bearing angle $(B'r_2, B'r_3 \ldots B'r_n)$ for each instrument relatively to the bearing angle $B'r$ of the gyroscopic element, which is compensated in the manner described in order that the different stabilizing angles due to orientation may be provided.

Thus, since $$I_1 = B'r - B'r_1$$
$$I_2 = B'r - B'r_2$$
$$I_n = B'r - B'r_n$$

Since the above-described group of instruments are serviced with the necessary level and cross-level angular corrections in any orientation they may assume, it follows that an instrument mounted fixedly on the ship may be similarly stabilized by feeding to its computer the value of the orientation of the stable element itself. Such a fixed instrument is a gyro-compass, for instance, which is usually present on a ship having a stable element. In this connection, if desired on such ships, the changing stabilizing angles from the stable element may be transformed in two steps, firstly, into roll and pitch angles for the compass and, secondly, from these roll and pitch angle values into all the special values of level and cross-level for the variously oriented remote instruments to be stabilized in the manner above described.

Accordingly, the direction of a telescope, gun, or other direction-indicating or -finding member in space may be maintained from a common stable element according to the invention, regardless of the unstable movements of the support and the instantaneous relative orientation angles of the stable element and the different remote instruments being stabilized therefrom. By transmitting the angle functions rather than the angles themselves from computer 40, the individual calculators for the instruments to be stabilized are rendered much simpler than would be the case if they used the angles directly. Also, greater accuracy results, because of the elimination of steps and consequent sources of error in the conversion.

Although a preferred embodiment of the invention has been illustrated and described herein, it is to be understood that the invention is not limited thereby, but is susceptible of changes in form and detail within the scope of the appended claims.

I claim:

1. In mechanism for stabilizing the position of a member mounted on an unstable support, the combination of a stable element mounted on said support for relative angular deviation movement in at least one plane in response to the unstable movements of said support, means for orienting said element about an axis substantially perpendicular to said support, electrical means responsive to said relative movement in said plane for developing a voltage proportional to a trigonometric function of the instantaneous angle of said movement, means for orienting said member about an axis substantially perpendicular to said support, mechanism for combining the orientation angles of said element and member, electrical means actuated by said mechanism for developing a voltage proportional to the orientation relation between said element and member, calculating mechanism for combining the voltages developed by said electrical means to develop a calculated deviation angle value for said member about an axis substantially perpendicular to said perpendicular axis, and means actuated by said calculating mechanism for stabilizing said member in accordance with said calculated deviation angle.

2. In mechanism for stabilizing the position of a member mounted on an unstable support, the combination of a stable element, a gimbal suspension therefor mounted on said support for relative angular deviation movement in at least one plane in response to the unstable movements of said support, means for orienting said element and its gimbal suspension about an axis substantially perpendicular to said support, electrical means responsive to said relative movement in said plane for developing a voltage proportional to a trigonometric function of the instantaneous angle of said movement, means for orienting said member about an axis substantially perpendicular to said support, electrical means jointly responsive to the orientation of said stable element and said member for developing a voltage proportional to the orientation relation between said element and member, calculating mechanism for combining the voltages developed by said electrical means to develop a calculated deviation angle value for said member about an axis substantially perpendicular to said perpendicular axis, and means actuated by said calculating mechanism for stabilizing said member in accordance with said calculated deviation angle.

3. In mechanism for stabilizing the position of a member, mounted on an unstable support, the combination of a stable element, a gimbal suspension therefor mounted on said support for relative angular deviation movement in at least one gimbal trunnion plane in response to the unstable movements of said support, means for orienting said element and its gimbal suspension about an axis substantially perpendicular to said support, electrical means responsive to said relative movement between said gimbal trunnion parts in said plane for developing a voltage proportional to a trigonometric function of the instantaneous angle of said movement, means for orienting said member about an axis substantially perpendicular to said support, electrical means responsive to the difference between the orientation angles of said stable element and said member for developing a voltage proportional thereto, calculating mechanism for combining the voltages developed by said electrical means to develop a calculated deviation angle value for said member about an axis substantially perpendicular to said perpendicular axis, and means actuated by said calculating mechanism for stabilizing said member in accordance with said calculated deviation angle.

4. In mechanism for stabilizing the position of a member mounted on an unstable support, the combination of a stable element, a gimbal suspension therefor mounted on said support for relative angular deviation movement in the planes of the trunnions of said gimbal suspension in response to the unstable movements of said support, means for orienting said element and its gimbal suspension about an axis substantially perpendicular to said support, electrical means responsive to said relative movement between the corresponding gimbal trunnion parts in said corresponding planes for developing voltages proportional to trigonometric functions of the corresponding instantaneous angles of said movement, means for orienting said member independently of said stable element about an axis substantially perpendicular to said support, electrical means responsive to the difference between the orientation angle of said stable element and said member for developing a voltage proportional thereto, calculating mechanism for combining the voltages developed by said electrical means to develop calculated deviation angle values for said member about an axis corresponding substantially to one of said gimbal trunnion axes, and means actuated by said calculating mechanism for stabilizing said member about its said one axis in accordance with the corresponding calculated deviation angle.

5. In mechanism for stabilizing the position of a member mounted on an unstable support, the combination of a stable element mounted on said support for relative angular deviation movement in at least one plane in response to the unstable movements of said support, means for orienting said element about an axis substantially perpendicular to said support, electrical means responsive to said relative movement in said plane for developing a voltage proportional to a trigonometric function of the instantaneous angle of said movement, electrical means responsive to the orientation movements of said stable element for developing a voltage proportional to the relative orientation angle, calculating mechanism for combining the voltages developed by said electrical means to develop a calculated deviation angle value for said member about an axis substantially perpendicular to said perpendicular axis, means for orienting said member independently of the orientation of said stable element, operative connections between said last-named means and said calculating mechanism for modifying the output of the latter, and means actuated by said calculating mechanism for stabilizing said member in accordance with said calculated deviation angle.

6. In mechanism for stabilizing the positions of a plurality of members mounted on an unstable support, the combination of a stable element mounted on said support for relative angular deviation movement in at least one plane in response to the unstable movements of said support, means for orienting said element about an axis substantially perpendicular to said support, electrical means responsive to said relative movement in said plane for developing a voltage proportional to the trigonometric function of the instantaneous angle of said movement, means for orienting each of said members independently of each other and said stable element, electrical means jointly responsive to said orientation of each of said members and said element for developing a corresponding voltage, calculating mechanism for combining the voltage developed by said electrical means to develop a calculated deviation angle value for each of said members about an axis substantially perpendicular to said perpendicular axis, and means energized by said calculating mechanism for stabilizing each of said members in accordance with said calculated deviation angle.

7. In mechanism for stabilizing the positions of a plurality of members mounted on an unstable support, the combination of a stable element, a gimbal suspension therefor mounted on said support for relative angular deviation movement in at least one plane in response to the unstable movements of said support, means for orienting said element and its gimbal suspension about an axis substantially perpendicular to said support, electrical means responsive to said relative movement in said plane for developing a voltage proportional to a trigonometric function of the instantaneous angle of said movement, means for orienting each of said members independently of each other and said stable element, electrical means responsive to the difference in said orientation between each of said members and said stable element for developing a corresponding voltage proportional to the difference angle of said orientation, calculating mechanism for combining the voltages developed by said electrical means to develop a calculated deviation angle value for each of said members about an axis substantially perpendicular to said perpendicular axis, and means actuated by said calculating mechanism for stabilizing each of said members in accordance with said calculated deviation angle.

8. In mechanism for stabilizing the positions of a plurality of members mounted on an unstable support, the combination of a stable element, a gimbal suspension mounted on said support for relative angular deviation movement in at least one gimbal trunnion plane in response to the unstable movements of said support, means for orienting said element and its gimbal suspension about an axis substantially perpendicular to said support, electrical means responsive to said relative movement between said gimbal trunnion parts in said plane for developing a voltage proportional to a trigonometric function of the instantaneous angle of said movement, means for orienting each of said members independently of each other and said stable element, electrical means responsive to the difference between said orientation between each of said members and said stable element for developing a voltage proportional to the difference angle of said orientation, calculating mechanism for combining the voltages developed by said electrical means to develop a calculated deviation angle value for each of said members about an axis corresponding substantially to one of said gimbal trunnion axes, and means actuated by said calculating mechanism for stabilizing each of said members about its said axis in accordance with said calculated deviation agle.

9. In mechanism for stabilizing the positions of a plurality of members mounted on an unstable support, the combination of a stable element mounted on said support for relative angular deviation movement in the planes of the trunnions of said gimbal suspension in response to the unstable movements of said support, means for orienting said element about an axis substantially perpendicular to said support, electrical means responsive to said relative movement between said gimbal trunnion parts in said corresponding planes for developing voltages proportional to a trigonometric function of the instantaneous angles of said movement, means for orienting each of said members independently of each other and said stable element, electrical means responsive to the difference between said orientation of each of said members and said stable element for developing a voltage proportional to the difference angle of said orientation, calculating mechanism for combining the voltages developed by said electrical means to develop calculated deviation angle values for each of said members about axes corresponding substantially to said gimbal trunnion axes, and means actuated by said calculating mechanism for stabilizing each of said members about its said axes in accordance with the corresponding calculated deviation angles.

10. In mechanism for stabilizing the positions of a plurality of members mounted on an unstable support, the combination of a stable element mounted on said support for relative angular deviation movement about at least one axis in response to the unstable movements of said support, means for orienting said element about an axis substantially perpendicular to said support, electrical means responsive to said relative movement in said plane for developing a voltage proportional to the trigonometric function of the instantaneous angle of said movement, electrical means responsive to the orientation movements of said stable element relatively to said member for developing a voltage proportional thereto, calculating mechanism for each of said members energized jointly by said electrical means to develop a calculated deviation angle value for each of said members about an axis corresponding substantially to said first axis, means for orienting each of said members independently of each other and said stable element, and operative connections between said last-named means and the corresponding calculating mechanism for modifying the output of the latter in accordance with the difference between the orientation angle of said element and the corresponding member, and means actuated by each of said calculating mechanisms for stabilizing the corresponding member in accordance with said calculated deviation angle developed thereby.

11. In mechanism for stabilizing the position of a member mounted on an unstable support, the combination of a stable element mounted on said support for relative angular deviation movement in at least one plane in response to the unstable movements of said support, means for orienting said element at will about an axis substantially perpendicular to said support, electrical means responsive to said relative movement in said plane for developing a voltage proportional to a trigonometric function of the instantaneous angle of said movement, electrical induction means having inductively-coupled stator and rotor windings, electrical connections between said electrical means and said stator winding for energizing the same, means for orienting said member at will independently of said stable element, operative connections between said orienting means and said rotor winding for jointly rotating the same in accordance with the difference between their orientation angles, electrical motive means energized at least partly in accordance with the voltage induced therein in said rotor winding, and operative connections between said motive means and said member for stabilizing the same.

12. In mechanism for stabilizing the position of a member mounted on an unstable support, the combination of a stable element mounted on said support for relative angular deviation movement in at least one plane in response to the unstable movements of said support, means for orienting said element at will about an axis substantially perpendicular to said support, electrical means responsive to said relative movement in said plane for developing a voltage proportional to a trigonometric function of the instantaneous angle of said movement, electrical induction means having inductively-coupled stator and rotor windings, electrical connections between said electrical means and said stator winding for energizing the same, operative connections between said orienting means and said rotor winding for rotating the same, means for orienting said member independently of said element, means actuated by said last-named orienting means for modifying the connections between said first-named orienting means and said rotor winding, electrical motive means energized at least partly by the voltage induced in said rotor winding, and operative connections between said motive means and said member for stabilizing the same.

13. In mechanism for stabilizing the position of a member mounted on an unstable support, the combination of a stable element, a gimbal suspension therefor mounted on said support for relative angular deviation movement in the planes of said gimbal trunnions in response to the unstable movements of said support, means for orienting said element at will about an axis substantially perpendicular to said support, electrical means responsive to said relative movement between said gimbal trunnion parts in said planes for developing voltages proportional to trigonometric functions of the instantaneous angles of said movement, electrical induction means having stator windings energized by said electrical means and an inductively-coupled rotor winding, means for orienting said member at will, differential mechanism jointly actuated by said orienting means for providing an angular movement equal to the angular difference in orientation between said member and stable element, operative connections between said mechanism and said rotor winding for rotating the same, electrical motive means energized at least partly in accordance with the voltage induced in said rotor winding, and operative connections between said motive means and said member for stabilizing the same.

14. In mechanism for stabilizing the position of a member mounted on an unstable support, the combination of a stable element, a gimbal suspension therefor mounted on said support for relative angular deviation movement in the planes of said gimbal trunnions in response to the unstable movements of said support, means for orienting said element at will about an axis substantially perpendicular to said support, electrical means responsive to said relative movement between said gimbal trunnion parts in said planes for developing voltages proportional to trigonometric functions of the instantaneous angles of said movement, electrical induction means having stator windings energized by said electrical means and inductively-coupled rotor windings, means for orienting said member at will, differential mechanism jointly actuated by said orienting means for producing an angular movement equal to the angular difference in orientation between said member and stable element, operative connections between said mechanism and said rotor winding for rotating the same, electrical means jointly energized from one rotor winding and said first-named electrical means, electrical means jointly energized from said other rotor winding and said second-named electrical means, a pair of motive means severally energized by the two last-named electrical means, and operative connections between each of said motive means and said member for stabilizing the same about axes corresponding to said gimbal axes.

15. In mechanism for stabilizing the position of a member mounted on an unstable support, the combination of a stable element, a gimbal suspension therefor mounted on said support for relative angular deviation movement in the planes of said gimbal trunnions in response to the unstable movement of said support, means for orienting said element at will about an axis substantially perpendicular to said support, electrical means responsive to said relative movement between said gimbal trunnion parts in said planes for developing voltages proportional to trigonometric functions of the instantaneous angles of said movement, electrical induction means having stator windings energized by said electrical means and inductively-coupled rotor windings, means for orienting said member at will, differential mechanism jointly actuated by said orienting means, operative connections between said mechanism and said rotor winding for rotating the same, second electrical induction means having stator windings energized by said electrical means and the voltage induced in one rotor winding of said first electrical induction means, a rotor for said second electrical induction means having a winding inductively coupled to said second stator windings, motive means energized by the voltage induced in said second electrical induction means rotor winding, and operative connections between said motive means and said member for stabilizing the same about an axis corresponding to one of said gimbal trunnions.

16. In a mechanism for stabilizing the position of a member mounted on an unstable support, the combination of a stable element, a gimbal suspension therefor mounted on said support for relative angular deviation movement in the planes of said gimbal trunnions in response to the unstable movement of said support, means for orienting said element at will about an axis substantially perpendicular to said support, electrical means responsive to said relative movement between said gimbal trunnion parts in said planes for developing voltages proportional to trigonometric functions of the instantaneous angles of said movement, electrical induction means having stator windings energized by said electrical means and inductively-coupled rotor windings, means for orienting said member at will, differential mechanism jointly actuated by said orienting means, operative connections between said mechanism and said rotor windings for rotating the same, second electrical induction means having stator windings energized by said electrical means and the voltage induced in one rotor winding of said first electrical induction means, a rotor for said second electrical induction means having a winding inductively coupled to said second stator windings, motive means energized by the voltage induced in said second rotor winding, third electrical induction means having stator windings energized by the voltages induced in the other rotor winding of said first-named electrical induction means and the voltage induced in the other second rotor winding, a third rotor having a winding inductively coupled to said third stator windings, second motive means energized by the voltage induced said third rotor winding, and operative connections between each of said motive means and said member for stabilizing the latter in two planes corresponding to said gimbal trunnion planes.

17. In mechanism for stabilizing the position of a member mounted on an unstable support, the combination of a stable element, a gimbal suspension therefor mounted on said support for relative angular deviation movement in the planes of said gimbal trunnions in response to the unstable movement of said support, means for orienting said element at will about an axis substantially perpendicular to said support, electrical means responsive to said relative movement between said gimbal trunnion parts in said planes for developing voltages proportional to trigonometric functions of the instantaneous angles of said movement, electrical inductive means having stator windings energized by said electrical means and an inductively-coupled rotor winding, operative connections between said orienting means and said rotor winding for rotating the same, means for orienting said member at will, means actuated by said orienting means for modifying the last-named connections, second electrical induction means having stator windings energized by said electrical means and the voltage induced in said first rotor winding, a second rotor having windings inductively coupled to said second stator windings, motive means energized by the voltage induced in one of said second rotor windings, third electrical induction means having stator windings energized by the voltages induced in said first and said other second rotor windings, a third rotor having a winding inductively coupled to said third stator windings, second motive means energized by the voltage induced said third rotor winding, and operative connections between each of said motive means and said member for stabilizing the latter in two planes corresponding to said gimbal trunnion planes.

18. In apparatus for stabilizing the position in space of a plurality of independently oriented remote members from an existing independently oriented first member having a universally suspended gyroscope for stabilizing the same in coordinate planes on an unstable support, the combination of a first computer actuated in accordance with relative movements between said gyroscope and said support in said planes for developing electrical quantities proportional to trigonometric functions of the corresponding angles of movement in said planes, a second computer for each of said remote members including electrical induction means having stator windings energized by said electrical quantities and inductively coupled rotor windings, differential mechanism jointly actuated in accordance with the orientation angles of said first member and the remote member corresponding to said second computer, operative connections between said mechanism and the rotor windings of said second computer for rotating the same in accordance with the difference in orientation angle between said first member and said corresponding remote member, motive means energized at least partly in accordance with the voltage induced in one of said rotor windings, second motive means energized at least partly in accordance with the voltage induced in the other of said rotor windings, and operative connections between each of said motive means and said member for stabilizing the latter in coordinate planes corresponding to said planes of said existing first member.

EDMUND D. GITTENS.

REFERENCES CITED

The following references are of record in the file of this patent:

UNITED STATES PATENTS

| Number | Name | Date |
|---|---|---|
| 1,733,531 | Dugan | Oct. 29, 1929 |
| 1,829,181 | Bates | Oct. 27, 1931 |
| 2,069,417 | Murtagh et al. | Feb. 2, 1937 |
| 2,339,508 | Newell | Jan. 18, 1944 |

Certificate of Correction

March 8, 1949.

Patent No. 2,463,687.

EDMUND D. GITTENS

It is hereby certified that errors appear in the printed specification of the above numbered patent requiring correction as follows:

Column 1, line 14, for the word "comprise" read *compromise*; column 5, line 62, for "applied to" read *applied from*; column 9, line 55, claim 8, for "agle" read *angle*; column 12, line 37, claim 16, after "In" strike out "a";

and that the said Letters Patent should be read with these corrections therein that the same may conform to the record of the case in the Patent Office.

Signed and sealed this 26th day of July, A. D. 1949.

[SEAL]

THOMAS F. MURPHY,
*Assistant Commissioner of Patents.*